United States Patent
Park et al.

(10) Patent No.: US 8,433,146 B2
(45) Date of Patent: Apr. 30, 2013

(54) METHOD FOR ENCODING IMAGE USING COLOR SPACE ESTIMATION

(75) Inventors: Ji Ho Park, Seoul (KR); Je Woo Kim, Seongnam-si (KR); Byeng Ho Choi, Yongin-si (KR)

(73) Assignee: Korea Electronics Technology Institute, Seongnam-Si (KR)

( * ) Notice: Subject to any disclaimer, the term of this patent is extended or adjusted under 35 U.S.C. 154(b) by 770 days.

(21) Appl. No.: 12/691,804

(22) Filed: Jan. 22, 2010

(65) Prior Publication Data

US 2011/0158520 A1    Jun. 30, 2011

(30) Foreign Application Priority Data

Dec. 31, 2009  (KR) .......................... 10-2009-0135337

(51) Int. Cl.
*G06K 9/46*    (2006.01)

(52) U.S. Cl.
USPC ......................................................... 382/232

(58) Field of Classification Search .................. 382/100, 382/162, 166, 232–253; 345/555–557; 348/384.1–440.1; 358/426.01–426.16; 375/122, 375/240.01–240.29; 708/203–206

See application file for complete search history.

(56) References Cited

U.S. PATENT DOCUMENTS 5,680,129 A    10/1997  Weinberger et al. ............ 341/65
6,021,227 A    2/2000   Sapiro et al. ................... 382/239

FOREIGN PATENT DOCUMENTS

KR    10-2007-0096736 A    10/2007

*Primary Examiner* — Atiba O Fitzpatrick

(74) *Attorney, Agent, or Firm* — Sughrue Mion, PLLC

(57) ABSTRACT

An image encoding method using color space estimation is provided. The image encoding method of the present invention selects an estimation mode of a current pixel to a color space estimation mode, a space estimation mode, or a combination mode of the color space estimation and the space estimation based on directionality of neighbor pixels and a size of a residual component. Using information between color spaces in the image encoding process, the image compression efficiency can be raised and the lossless image compression can be achieved by ruling out similarity of pixel values.

18 Claims, 4 Drawing Sheets

METHOD FOR ENCODING IMAGE USING COLOR SPACE ESTIMATION

PRIORITY

This application claims the benefit under 35 U.S.C. §119(a) to a Korean patent application filed in the Korean Intellectual Property Office on Dec. 31, 2009 and assigned Serial No. 10-2009-135337, the entire disclosure of which is hereby incorporated by reference.

BACKGROUND OF THE INVENTION

1. Field of the Invention

The present invention relates generally to a method for encoding an image using color space estimation. More particularly, the present invention relates to an image encoding method using the color space estimation, which can compress the image without loss by ruling out similarity between pixels.

2. Description of the Related Art

Video encoding includes a lossy compression scheme and a lossless compression scheme. To compress the video without loss, it is general to entropy-encode an error signal which is a difference between an estimated block according to an estimation result and a current block, rather than applying Discrete Cosine Transform (DCT) or quantization.

The conventional lossless compression scheme uses the pixel based compression. Given that a pixel to currently encode or decode is Ix, a pixel on the left is Ra, a pixel above Ix is Rb, a top-left pixel is Rc, and a top-right pixel is Rd, the encoding is performed using the relation between the neighbor pixels and the current pixel. When all of the neighbor pixel values are the same, the conventional lossless compression scheme operates in a Run mode. When the neighbor pixel values are inconsistent, the conventional lossless compression scheme operates in a Regular mode.

In the Run mode, when the number of fixed-length Runs is repeated, the method encodes/decodes a bit indicative of the occurrence of the Runs as many as the fixed length and then checks whether the Run is continued. When all of the neighbor pixel values do not match, the inconsistent pixel value is encoded. In so doing, the encoding method is similar to the Regular mode.

In the Regular mode, the encoding is performed using how different the neighbor pixel values are. First, difference values of the neighbor pixel values are calculated. Three difference values of D1=Rd−Rb, D2=Rb−Rc, and D3=Rc−Ra are used, and the acquired D1, D2 and D3 are quantized using a particular threshold. The quantization value has 9 cases ranging −3~3. D1, D2 and D3 each have 9×9×9 cases. However, since both of the negative number and the positive number are used as the same value, the number of cases is reduced by half. Accordingly, the encoding varies according to 365 cases.

When the most similar value to the current pixel is set to an estimation value Px, Px can be calculated as follows:

```
if (Rc >= max(Ra, Rb))
Px = min(Ra, Rb);
else {
If (Rc <= min(Ra, Rb))
Px = max(Ra, Rb);
else
Px = Ra + Rb − Rc;
}
```

The encoded or decoded value is a differential value from the difference between the calculated estimation value Px and the current(Ix) pixel value. The differential value can be a negative number. To make it to a positive number, a particular value is added. For example, as for an 8-bit depth value, 256 is added to modify the range of the differential value to 0~255.

Next, this value is modified into the normal range. As for the value more than half of the entire displacement; that is, as for 8 bits, the value greater than 128 is added with −128 and its displacement is modified to −128~127. The substantial bit sequence coding employs a limited golomb code.

The conventional lossless compression method as discussed above encodes or decodes using only the neighbor pixel values, and the value used to encode/decode the current pixel is only 4 neighbor pixel values. Thus, a new method for raising the encoding and decoding efficiency is demanded.

SUMMARY OF THE INVENTION

An aspect of the present invention is to address at least the above mentioned problems and/or disadvantages and to provide at least the advantages described below. Accordingly, an aspect of the present invention is to provide an image encoding method using color space estimation, which encodes a current pixel by selecting an estimation mode of the current pixel based on directionality of neighbor pixels and a size of a residual component and referring to a previously encoded pixel of the color space.

According to one aspect of the present invention, an image encoding method using color space estimation, which encodes a current pixel according to directionality of neighbor pixels and a size of a residual component, includes encoding a pixel of a first color space; selecting an estimation mode of the current pixel from a color space estimation mode and a space estimation mode by taking into account the directionality of the neighbor pixels respect to the current pixel of a second color space and the size of the residual component between a current pixel value and a neighbor pixel value; calculating an estimation value according to the selected estimation mode; and encoding a difference value of the calculated estimation value and the current pixel value.

The directionality of the neighbor pixels may be a horizontal direction or a vertical direction.

The selecting of the estimation mode, when the estimation direction of the neighbor pixels is the space estimation and has a constant directionality and the estimation direction of the current pixel matches the constant direction of the neighbor pixels, may select the space estimation mode as the estimation mode.

When the estimation direction of the neighbor pixels is the space estimation and has a constant directionality and the estimation direction of the current pixel does not match the constant direction of the neighbor pixels, the estimation mode of the current pixel may be selected according to the size of the residual component.

When the size of the residual component is a first threshold, the estimation mode of the current pixel may select the space estimation mode.

When the size of the residual component is a second threshold, the estimation mode of the current pixel may be a combination of the color space estimation mode and the space estimation mode with a weight.

When the size of the residual component is a third threshold, the estimation mode of the current pixel may select the color space estimation mode.

The selecting of the estimation mode may include when the estimation direction of the neighbor pixels with respect to the current pixel is the space estimation and has no constant direction, selecting the estimation mode of the current pixel according to the size of the residual component.

When the size of the residual component is a first threshold to a second threshold, the estimation mode of the current pixel may select the space estimation mode.

When the size of the residual component is a second threshold to a third threshold, the estimation mode of the current pixel may be a combination of the color space estimation mode and the space estimation mode.

The selecting of the estimation mode may, when the estimation direction of the neighbor pixels is the color space estimation, select the estimation mode of the current pixel according to the size of the residual component.

When the size of the residual component is a first threshold to a second threshold, the estimation mode of the current pixel may use the space estimation mode.

When the size of the residual component is a second threshold to a third threshold, the estimation mode of the current pixel may be a combination of the color space estimation mode and the space estimation mode.

The selecting of the estimation mode, when the estimation direction of the neighbor pixels combines the color space estimation and the space estimation, the estimation direction of the current pixel has no constant direction, and the size of the residual component is greater than a first threshold, may combine the color space estimation mode and the space estimation mode as the estimation mode of the current pixel.

When the estimation mode combines the color space estimation mode and the space estimation mode, the estimation value may be determined by the following equation:

$$P\text{new} = Pix(a) - Px(1-a)$$

where Pnew is the estimation value when the color space estimation mode and the space estimation mode are combined and used, Pix is a color space estimation value, Px is a space estimation value, a is a weight according to the color space estimation, and 1–a is a weight according to the space estimation.

The weight according to the space estimation may be determined by an average value of a residual component size of the second color space.

The weight according to the color space estimation may be determined by an average value of a residual component size of the first color space.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
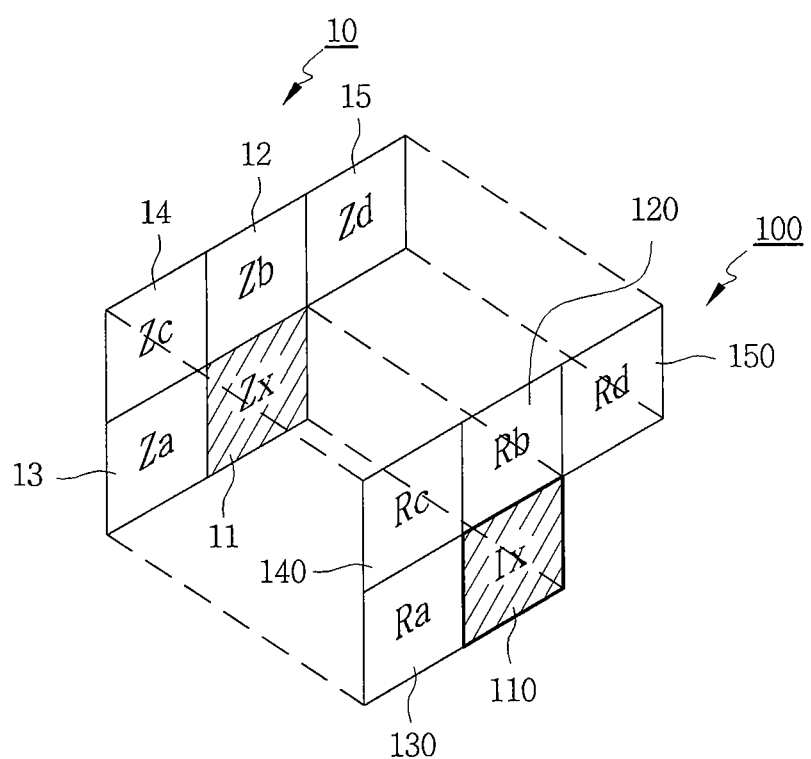
FIG. 1 is a diagram of a color space used in an image encoding method using color space estimation according to an exemplary embodiment of the present invention.

FIG. 1 is a diagram of a color space used in an image encoding method using color space estimation according to an exemplary embodiment of the present invention.

Referring to FIG. 1, an input video signal uses various color spaces to rule out mutual redundancy. Three color spaces can be employed. YUV or RGB are representative examples. The present invention is not limited to one color space and utilizes a plurality of different color spaces. When the plurality of the color spaces is used, the color space encoded or decoded first is referred to as a first color space 10 and the color space encoded or decoded using an image encoding method based on the color space estimation according to an exemplary embodiment of the present invention is referred to as a second color space 100. In this exemplary embodiment, the second color space 100 makes use of the pre-encoded first color space 10.

For example, when the input video signal is encoded using the color space, it can be encoded in the order of GBR. The G color space corresponds to the first color space 10 and the B color space corresponds to the second color space 100. The signal of the G color space is encoded using the conventional encoding method. Next, to encode the signal of the B color space, the pre-encoded G color space can be referred to.

The B color space 100 includes a current pixel Ix 110 to encode, and neighbor pixels Ra 130, Rb 120, Rc 140, and Rd 150 of the Ix 110, which are the same color space signals as the current pixel Ix 110. The G color space 10 lies in coordinates corresponding to the current pixel Ix 110 and includes Za 13, Zb 12, Zc 14, and Zd 15 pre-encoded. The B color space 100 and the G color space 10; that is, the second color space 100 and the first color space 10 include the pixels of which the coordinates correspond with each other.

Figure 2:
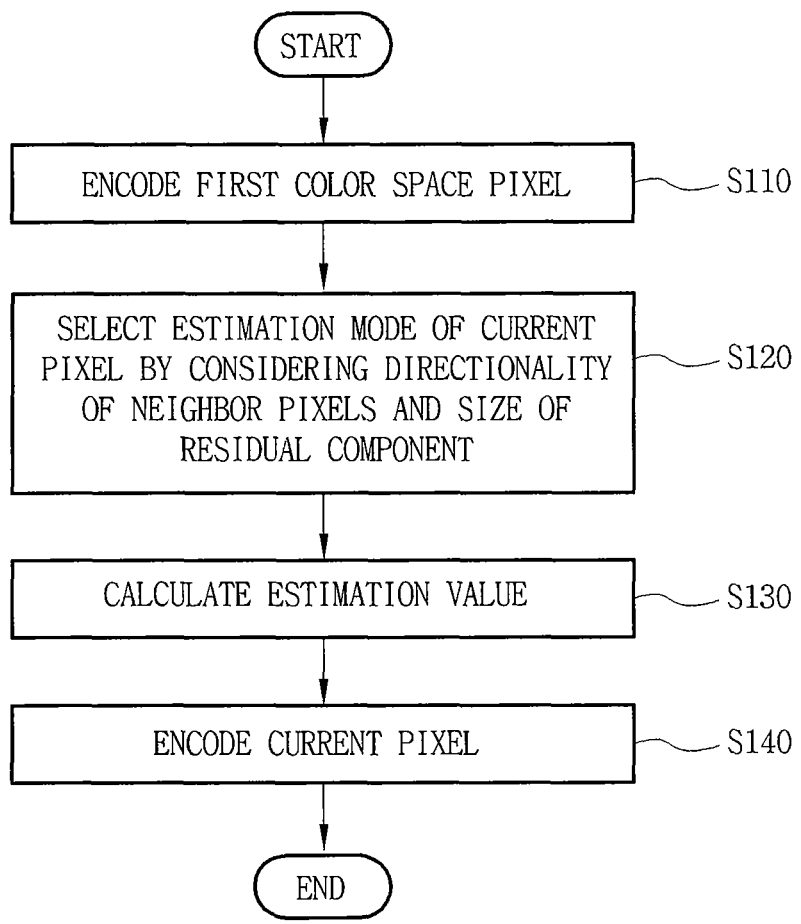
FIG. 2 is a flowchart of the image encoding method using the color space estimation according to an exemplary embodiment of the present invention.

FIG. 2 is a flowchart of the image encoding method using the color space estimation according to an exemplary embodiment of the present invention.

In FIG. 2, the image encoding method using the color space estimation according to an exemplary embodiment of the present invention encodes a plurality of color spaces in a certain order. First, the pixel of the first color space is encoded (S110). The first color space can be encoded using the conventional general image encoding method. When the encoding of the first color space is completed, the second color space is encoded by referring to the first color space. When the encoding of the second color space is completed, the third color space can be encoded by referring to the first color space or the second color space. That is, the input image signal has the plurality of the color spaces. The first color space is encoded using the conventional encoding method and the next incoming color space is encoded using the encoding result of the first color space.

The current pixel to encode can be encoded by selecting a color space estimation method or a space estimation method.

The space estimation method can affect the estimation of the current pixel by comparing a space estimation direction of neighbor pixels in a certain region and a size of a residual component according to the estimation. The space estimation method makes use of the neighbor pixels of the pixel to currently encode (e.g., the neighbor pixels of Ix in FIG. 1).

When the first color space pre-encoded is given, the color space estimation method encodes the second color space by referring to the first color space. Accordingly, the current pixel of the present invention is assumed to belong to the second color space. The current pixel of the second color space can adopt the space estimation method using its neighbor pixels, and the color space estimation method by referring to the first color space. Further, to encode the third color space, the first color space or the second color space can be referred to.

The image encoding method using the color space estimation encodes the current pixel by selecting an estimation mode which determines the estimation direction of the current pixel. For example, the current pixel of the second color space can refer to the directionality of its neighbor pixels and the size of the residual component using the space estimation method. Using the color space estimation method, the current pixel can take into account the directionality of the neighbor pixels and the size of the residual component referred to when a certain pixel of the first color space is encoded.

When the first color space pixel is encoded using a certain method, the current pixel of the second color space selects the estimation mode of the current pixel by considering the directionality of the neighbor pixels and the size of the residual component (S120). When the estimation mode is selected, the estimation value corresponding to the estimation mode is calculated (S130). The current pixel is encoded using the calculated estimation value (S140).

Figure 3A:
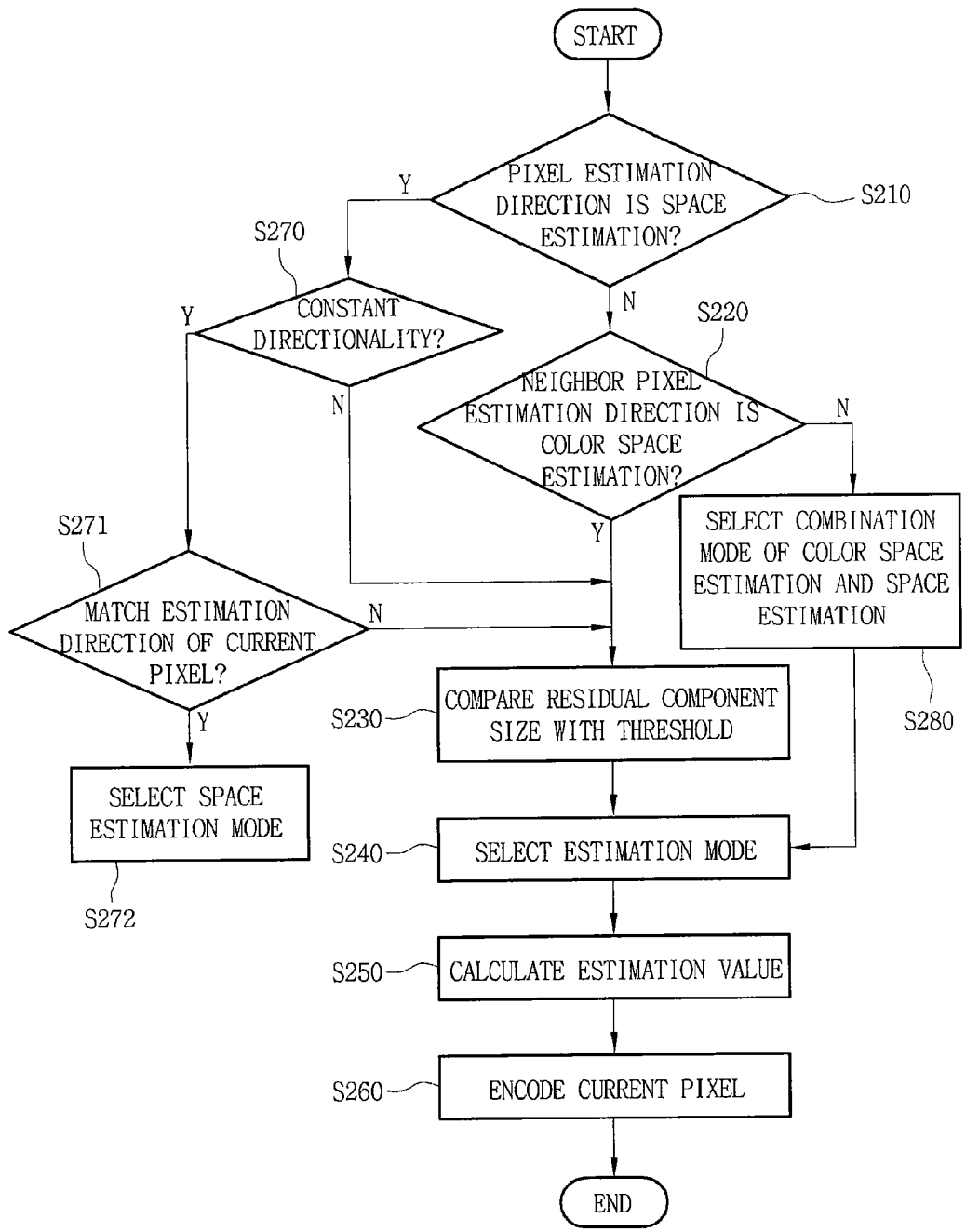
FIG. 3A is a flowchart of an estimation mode selecting method according to an exemplary embodiment of the present invention.
Figure 3B:
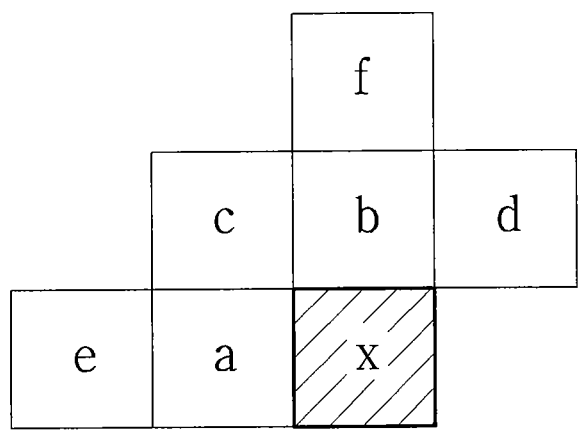
FIG. 3B is a diagram of a color space for explaining the estimation mode selecting method of FIG. 3A.

A method for selecting the estimation mode of the current pixel is explained in FIGS. 3A and 3B. FIG. 3A is a flowchart of the estimation mode selecting method according to an exemplary embodiment of the present invention and FIG. 3B is a diagram of a color space for explaining the estimation mode selecting method of FIG. 3A.

In FIG. 3A, to determine the estimation mode of the current pixel, the estimation direction of the neighbor pixels of the current pixel is determined. According to the determination, the estimation direction of the neighbor pixels indicates the space estimation (S210:Y). That is, the estimation direction used to encode the neighbor pixels of the current pixel indicates the space estimation, not the color space estimation.

As for the space estimation, a constant directionality is examined (S270). For example, in FIG. 3B, all of the neighbor pixels a, b, c, d, e and f of the current pixel x are encoded using the space estimation. The method determines whether the estimation direction of the all of the neighbor pixels has a constant directionality in the horizontal direction (S270).

When all of the neighbor pixels a, b, c, d, e and f of the current pixel x indicate the space estimation and the constant directionality, the method determines whether the estimation direction of the current pixel matches the estimation direction of the neighbor pixels (S271). When the estimation direction of the current pixel x matches the estimation direction of all of the neighbor pixels a, b, c, d, e and f of the current pixel x, the estimation mode of the current pixel x selects the space estimation mode (S272).

When the estimation direction of the current pixel x does not match the estimation direction of all of the neighbor pixels a, b, c, d, e and f of the current pixel x, the size of the residual component is compared with a threshold (S230) and the estimation mode of the current pixel is selected (S240).

When the size of the residual component is a first threshold (e.g., value 0~3); that is, when the residual component around is low, the space estimation mode is selected as the estimation mode of the current pixel.

When the size of the residual component is a second threshold (e.g., 4~8); that is, the residual component around is mid, a combination mode of the space estimation mode and the color space estimation mode is selected as the estimation mode of the current pixel.

When the size of the residual component is a third threshold (e.g., greater than 0); that is, when the residual component around is high, the color space estimation mode is selected as the estimation mode of the current pixel.

As stated earlier, when the estimation direction of the neighbor pixels indicates the space estimation and the constant directionality and the estimation direction of the current pixel does not match the estimation direction of the neighbor pixels, the estimation mode of the current pixel selected can vary according to the size of the residual component. Next, the estimation value in the selected estimation mode is calculated (S250) and the current pixel is encoded (S260).

The present invention can store the space estimation directionality used in the previous color space and the size of the substantial residual component and utilize them in the next color space. Referring back to FIG. 1, the space estimation can have three estimation directions including the estimation toward Ra (the horizontal estimation), the estimation toward Rb (the vertical estimation), and the estimation toward Ra+Rb−Rc. This can be the basis for determining in which direction the similarity is higher in each image.

While the conventional lossless compression method does not use the information of the other color space at all, the present invention can store and use the space estimation direction of the previous color space (the first color space) to encode the second color space. The space estimation direction of the previous color space can include 4 cases of the three directionalities and a Run mode which is another mode of the lossless compression method. The size of the substantial residual component indicates the size of the difference value of the estimation value and the pixel value of the current pixel.

Rather than storing the size value of the substantial residual component, the present invention can divide three steps of low/mid/high based on thresholds and merely store which one of the three steps the size value of the residual component belongs to.

The reference thresholds for determining the low/mid/high can be defined as 0~3, 4~8, and 9 or more respectively. Regions of the divided three steps can be stored with a 1-byte representative value, 2 bits of the MSB can indicate whether the size of the residual component is low/mid/high, and 2 bits of the LSB can indicate the directionality.

When the estimation direction of every neighbor pixel a, b, c, d, e and f of the current pixel x is the space estimation and has no constant directionality, the size of the residual component is compared with a threshold (S230) and thus the estimation mode is selected (S240).

According to the result of the comparison, when the size of the residual component is between the first threshold and the second threshold; that is, 0~8, the space estimation mode is selected as the estimation mode of the current pixel. According to the result of the comparison, when the size of the residual component is between the second threshold and the third threshold; that is, is greater than 4, the combination mode of the space estimation mode and the color space estimation mode is selected as the estimation mode of the current pixel. Next, the estimation value is calculated in the selected estimation mode (S250) and the current pixel is encoded (S260).

When the estimation direction of every neighbor pixel a, b, c, d, e and f of the current pixel x is the color space estimation (S220:Y), the estimation mode of the current pixel is selected based on the size of the residual component. In this case, the same mode as in the case where the directionality of the current pixel and the neighbor pixels matches and the size of the residual component is the first threshold (low) is selected. When the directionality of the current pixel and the neighbor pixels does not match and the size of the residual component is not low, the combination mode of the color space estimation mode and the space estimation mode is selected.

When the estimation mode combines the color space estimation mode and the space estimation mode, the estimation value can be determined by the following equation.

$$Pnew = Pix(a) - Px(1-a) \quad \text{Equation 1}$$

In the equation, Pnew is the estimation value when the color space estimation mode and the space estimation mode are combined and used, Pix is the color space estimation value, Px is the space estimation value, a is the weight according to the color space estimation, and 1−a is the weight according to the space estimation.

The weight 1−a according to the space estimation can be determined by storing the size of the residual component within a certain range, matching certain points according to which step of low~high includes the size of the residual component, and determining whether the threshold is exceeded using the average of the points.

The weight a of the color space can be determined by the average of the size of the residual component of the other corresponding color space. The weight of the color space used in the previous color space (the first color space) can be used as it is.

It is apparent that the image encoding method using the color space estimation of the present invention can be applied to an image decoding method using the color space estimation.

Herein, the image covers all of still images and videos.

The present invention can be implemented using a recording medium readable by a computer containing a computer program to execute the image encoding method which encodes the current pixel based on the directionality of the neighbor pixels and the size of the residual component.

According to the present invention, since the pixels of the color space after the pre-encoded first color space can be used to encode the values of the previous color space, the image compression efficiency can be enhanced.

The image compression efficiency can be raised by selecting the estimation mode of the current pixel according to the directionality of the neighbor pixels and the size of the residual component and determining which one of the space estimation method and the color space estimation method is superior.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image encoding method using color space estimation, which encodes a current pixel according to directionality of neighbor pixels and a size of a residual component, the method comprising:

encoding a pixel of a first color space;

selecting an estimation mode of the current pixel from a color space estimation mode and a space estimation mode by taking into account the directionality of the neighbor pixels respect to the current pixel of a second color space and the size of the residual component between a current pixel value and a neighbor pixel value;

calculating an estimation value according to the selected estimation mode; and encoding a difference value of the calculated estimation value and the current pixel value.

2. The image encoding method of claim 1, wherein the directionality of the neighbor pixels is a horizontal direction or a vertical direction.

3. The image encoding method of claim 1, wherein the selecting of the estimation mode, when the estimation direction of the neighbor pixels is the space estimation and has a constant directionality and the estimation direction of the current pixel matches the constant direction of the neighbor pixels, selects the space estimation mode as the estimation mode.

4. The image encoding method of claim 1, wherein the selecting of the estimation mode comprises:

when the estimation direction of the neighbor pixels is the space estimation and has a constant directionality and the estimation direction of the current pixel does not match the constant direction of the neighbor pixels, selecting the estimation mode of the current pixel according to the size of the residual component.

5. The image encoding method of claim 4, wherein, when the size of the residual component is a first threshold, the estimation mode of the current pixel is the space estimation mode.

6. The image encoding method of claim 4, wherein, when the size of the residual component is a second threshold, the estimation mode of the current pixel is a combination of the color space estimation mode and the space estimation mode with a weight.

7. The image encoding method of claim 4, wherein, when the size of the residual component is a third threshold, the estimation mode of the current pixel is the color space estimation mode.

8. The image encoding method of claim 1, wherein the selecting of the estimation mode comprises:

when the estimation direction of the neighbor pixels with respect to the current pixel is the space estimation and has no constant direction, selecting the estimation mode of the current pixel according to the size of the residual component.

9. The image encoding method of claim 8, wherein, when the size of the residual component is a first threshold to a second threshold, the estimation mode of the current pixel is the space estimation mode.

10. The image encoding method of claim 8, wherein, when the size of the residual component is a second threshold to a third threshold, the estimation mode of the current pixel is a combination of the color space estimation mode and the space estimation mode.

11. The image encoding method of claim 1, wherein the selecting of the estimation mode comprises:

when the estimation direction of the neighbor pixels is the color space estimation, selecting the estimation mode of the current pixel according to the size of the residual component.

12. The image encoding method of claim 11, wherein, when the size of the residual component is a second threshold to a third threshold, the estimation mode of the current pixel is a combination of the color space estimation mode and the space estimation mode.

13. The image encoding method of claim 1, wherein the selecting of the estimation mode, when the estimation direction of the neighbor pixels combines the color space estimation and the space estimation, the estimation direction of the current pixel has no constant direction, and the size of the residual component is greater than a first threshold, combines the color space estimation mode and the space estimation mode as the estimation mode of the current pixel.

14. The image encoding method of claim 1, wherein, when the estimation mode combines the color space estimation mode and the space estimation mode, the estimation value is determined by the following equation:

$$P\text{new} = Pix(a) - Px(1-a)$$

where Pnew is the estimation value when the color space estimation mode and the space estimation mode are combined and used, Pix is a color space estimation value, Px is a space estimation value, a is a weight according to the color space estimation, and 1−a is a weight according to the space estimation.

15. The image encoding method of claim 14, wherein the weight according to the space estimation is determined by an average value of a residual component size of the second color space.

16. The image encoding method of claim 14, wherein the weight according to the color space estimation is determined by an average value of a residual component size of the first color space.

17. The image encoding method of claim 1, wherein the size of the residual component is stored to an external memory.

18. A non-transitory computer readable recording medium containing a computer program to execute an image encoding method for encoding a current pixel according to directionality of neighbor pixels and a size of a residual component, the method comprising encoding a pixel of a first color space; selecting an estimation mode of the current pixel from a color space estimation mode and a space estimation mode by taking into account the directionality of the neighbor pixels respect to the current pixel of a second color space and the size of the residual component between a current pixel value and a neighbor pixel value; calculating an estimation value according to the selected estimation mode; and encoding a difference value of the calculated estimation value and the current pixel value.

* * * * *